(12) United States Patent
Jean et al.

(10) Patent No.: US 7,194,889 B1
(45) Date of Patent: Mar. 27, 2007

(54) MEMS MULTI-DIRECTIONAL SHOCK SENSOR WITH MULTIPLE MASSES

(75) Inventors: Daniel Jean, Odenton, MD (US); Gabriel Smith, Odenton, MD (US); John Kunstmann, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 114 days.

(21) Appl. No.: 11/198,410

(22) Filed: Aug. 4, 2005

(51) Int. Cl.
*G01M 7/00* (2006.01)

(52) U.S. Cl. ..................... 73/12.04; 73/12.01
(58) Field of Classification Search ............. 73/12.04, 73/504.14
See application file for complete search history.

(56) References Cited

U.S. PATENT DOCUMENTS

| | | | |
|---|---|---|---|
| 3,117,196 A * | 1/1964 | Vincent ............... 200/61.45 R |
| 4,470,302 A | 9/1984 | Carte | |
| 4,787,246 A | 11/1988 | Komatsu et al. | |
| 5,506,568 A | 4/1996 | Chen | |
| 5,507,182 A | 4/1996 | Yamada et al. | |
| 5,585,566 A | 12/1996 | Welles, II et al. | |
| 5,664,665 A | 9/1997 | Kobayashi et al. | |
| 5,811,910 A | 9/1998 | Cameron et al. | |
| 6,040,625 A | 3/2000 | Ip | |
| 6,104,307 A | 8/2000 | Hanratty | |
| 6,167,809 B1 * | 1/2001 | Robinson et al. ........... 102/235 |
| 6,236,005 B1 | 5/2001 | Kvisteroet et al. | |
| 6,329,618 B1 | 12/2001 | James et al. | |
| 6,453,746 B1 * | 9/2002 | Polosky et al. ............... 73/530 |
| 6,619,123 B2 | 9/2003 | Gianchandani et al. | |
| 6,626,040 B1 * | 9/2003 | Pereira et al. ........... 73/514.38 |
| 6,737,979 B1 | 5/2004 | Smith et al. | |
| 6,964,231 B1 * | 11/2005 | Robinson et al. ........... 102/235 |
| 2005/0217467 A1 * | 10/2005 | Bolle ......................... 89/1.701 |
| 2006/0220803 A1 * | 10/2006 | Kranz et al. ........... 340/426.24 |

* cited by examiner

*Primary Examiner*—Edward Lefkowitz
*Assistant Examiner*—Punam Patel
(74) *Attorney, Agent, or Firm*—Fredric J. Zimmerman

(57) ABSTRACT

A multi-directional shock sensor including two masses arranged to move in directions, which are mutually perpendicular to one another. A moveable locking member prevents movement of a slider, which is used in the arming arrangement of a submunition. In response to an acceleration in a plane, one or both masses will move. The masses are operably coupled to the locking member to effect its movement out of its locking engagement with the slider, due to such acceleration.

19 Claims, 7 Drawing Sheets

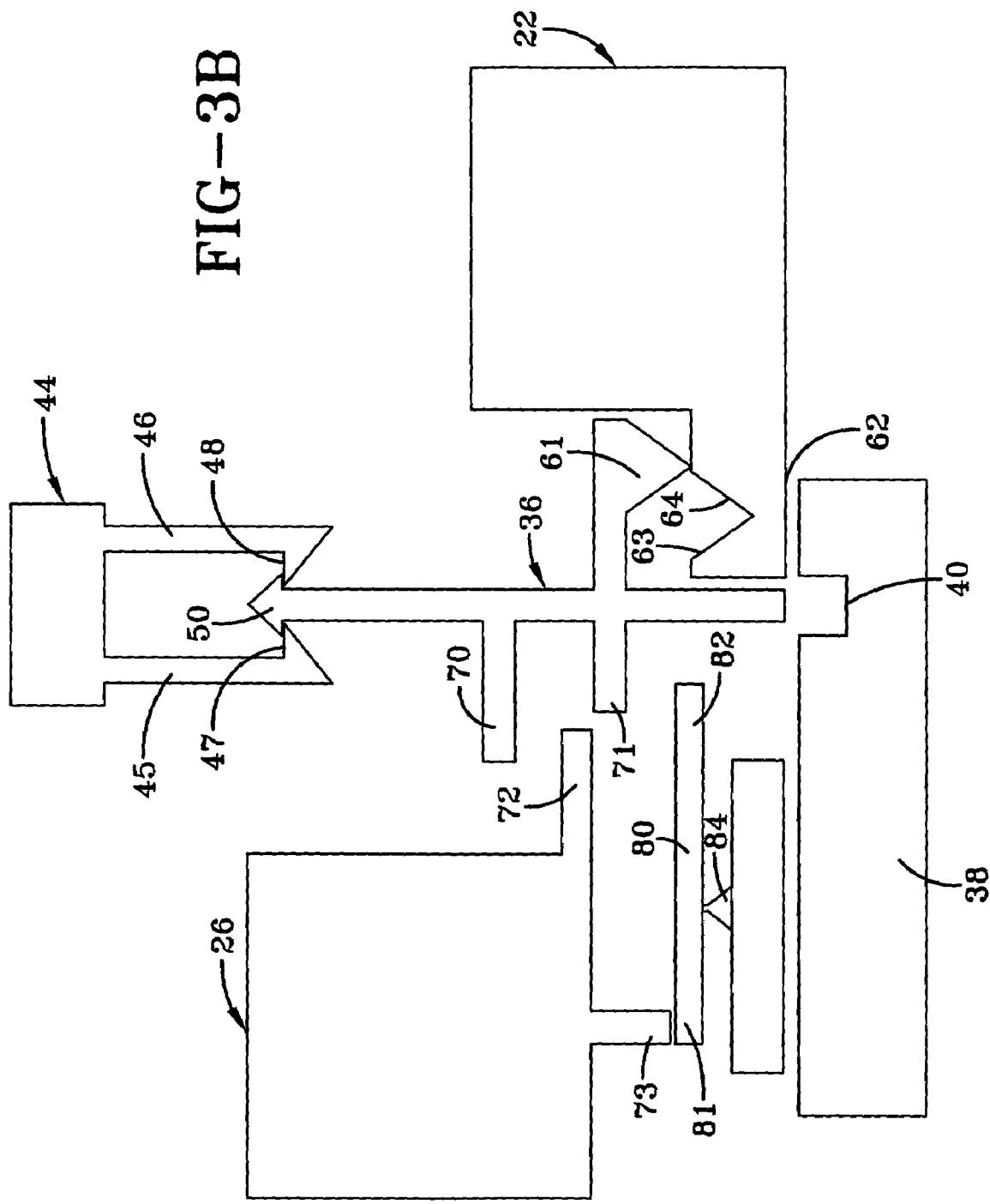

US 7,194,889 B1

MEMS MULTI-DIRECTIONAL SHOCK SENSOR WITH MULTIPLE MASSES

STATEMENT OF GOVERNMENT INTEREST

The invention described herein may be manufactured and used by or for the Government of the United States of America for government purposes without the payment of any royalties therefor.

BACKGROUND OF THE INVENTION

Various scenarios exist where it is desirable to delay the initiation of an event until some time after an initial shock or acceleration. By way of example, in order to prevent premature detonation, many munition rounds, such as artillery shells, go through a multi-stage arming sequence after being fired. It is required that the sequence commence only after the shell has been fired, and for this purpose a delay after firing is imposed in the procedure.

The same delay procedure also applies to submunition arrangements where an artillery shell contains a plurality of smaller rounds, or a bomb contains a plurality of bomblets, by way of example. That is, after separation from the carrier shell or bomb, a time delay is imposed on these submunitions to prevent premature detonation.

This delay may be accomplished by an electronic sensor connected to the munition fuze. This sensor would sense the acceleration upon separation of the submunition from the carrier and convert this to an electronic signal which could be used to activate an actuator to remove a lock in the arming arrangement. Such sensor however, requires a power supply, signal processing circuitry and occupies an objectionably large space.

The present invention obviates these drawbacks. It is an object of the present invention to provide a multi-directional shock sensor having a mechanical design, which requires no power supply and can be fabricated by MEMS (micro electromechanical systems) techniques resulting in a relatively small shock, or acceleration sensor.

It is another object of the present invention to provide a multi-directional shock sensor that is responsive to a shock from any direction in a plane of the sensor.

It is a further object of the present invention to provide a multi-directional shock sensor that is responsive and serves rough handling during shipping, for example, if a package is dropped.

SUMMARY OF THE INVENTION

A multi-directional shock sensor is described and includes an elongated moveable member normally situated at a first location. A first mass is operable to move the moveable member out of the first location to a second location, in response to an acceleration having an acceleration component in a first positive or negative direction. A second mass is operable to move the moveable member out of the first location to the second location, in response to an acceleration having an acceleration component in a second positive or negative direction. A plurality of supports is provided and a plurality of springs connect the first and second masses and the elongated moveable member to respective ones of the supports.

BRIEF DESCRIPTION OF THE DRAWINGS

The invention will be better understood, and further objects, features and advantages thereof will become more apparent from the following description of the exemplary embodiments, taken in conjunction with the accompanying drawings, in which:

FIGS. 3A to 3D illustrate the operation of the device of FIG. 2.

DETAILED DESCRIPTION OF THE EMBODIMENTS

Figure 1:
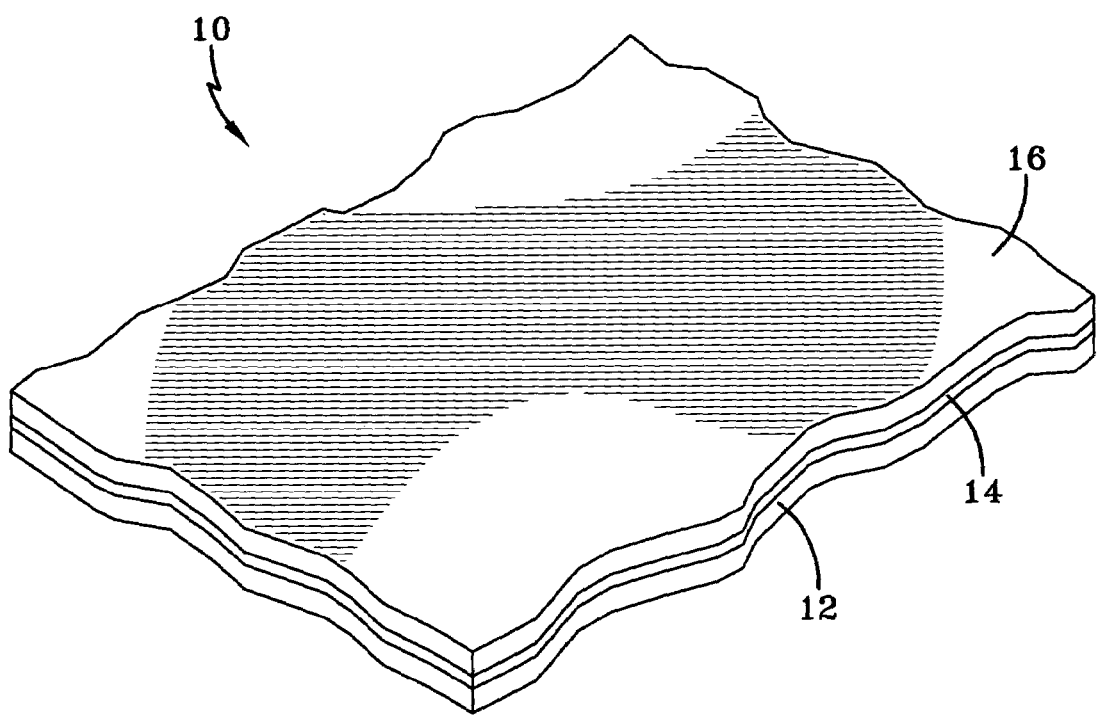
FIG. 1 is a view of an SOI (silicon on insulator) wafer prior to fabrication of the multi-directional shock sensor.

In the drawings, which are not necessarily to scale, like or corresponding parts are denoted by like or corresponding reference numerals.

FIG. 1 illustrates a portion of an SOI wafer 10 from which the sensor of the present invention will be fabricated. The structure of FIG. 1 includes a silicon substrate 12 (also known as a handle layer) covered by an insulating layer 14, such as silicon dioxide, over which is deposited another silicon layer 16 (also known as the device layer), which is the layer from which the sensor will be produced.

Figure 2:
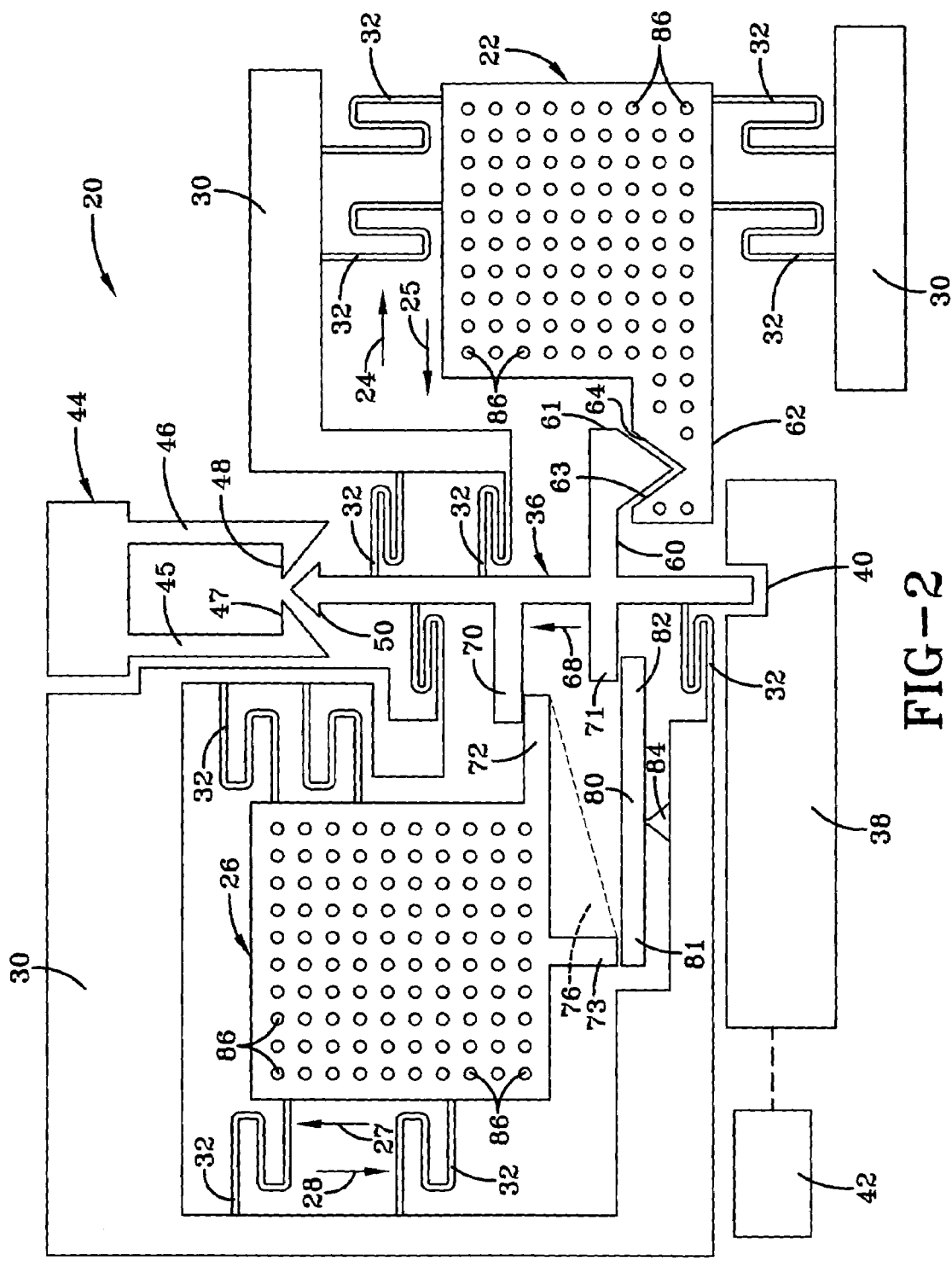
FIG. 2 illustrates one embodiment of the present invention.

FIG. 2 is a view of one embodiment of a sensor 20 formed from the wafer 10 of FIG. 1. The sensor is formed by a DRIE (deep reactive ion etching) process which removes unwanted portions of layer 16. The DRIE process is a well developed micromachining process used extensively with silicon based MEMS devices. For this reason, silicon is a material for the sensor of the present invention, although other materials are possible. Sensor 20 is one of a multitude of similar sensors fabricated on the same wafer 10, with all of the sensors being separated after fabrication for use as individual multi-directional shock sensors. Sensor 20 is responsive to a shock from any direction in a plane of the sensor 20.

Sensor 20 has many uses; however it will be described, by way of example, with respect to use in a submunition which is expelled from a carrier. Sensor 20 includes a first mass 22 operable to move in a first direction, as indicated by arrow 24, or opposite direction, as indicated by arrow 25. Sensor 20 further includes a second mass 26 operable to move in a second direction, as indicated by arrow 27, or opposite direction, as indicated by arrow 28. Movement of the masses 22 and 26 is perpendicular to one another and is effected by an acceleration having an acceleration component lying in any of the four indicated directions, with mass movement being opposite to that of the acceleration component. Accordingly, first direction 24 and related opposite direction 25 are substantially perpendicular to second direction 27 and related opposite direction 28. Sensor 20 is mounted in the submunition in a manner that it will experience acceleration in the plane of the sensor when expelled. Masses 22 and 26, as well as other moveable components to be described, are connected to a plurality of supports 30 by means of respective springs 32.

An elongated moveable member 36 is provided intermediate the masses 22 and 26 so that the elongated moveable member 36 is substantially adjacent the masses 22 and 26. Further, in an exemplary embodiment, the elongated moveable member 36 is in contact with second mass 26. The elongated moveable member 36 is oriented substantially perpendicular to a slider 38. The elongated moveable member 36 (sometimes referred to herein as "locking member" 36) acts as a locking member to prevent movement of the slider 38, which is part of the arming arrangement of the submunition. Locking member 36, which is normally at a first position as illustrated in FIG. 2, engages a notch 40 of slider 38 to prevent its movement. When locking member 36 is withdrawn from the notch 40, as will be described, slider 38 will be free to move, under the direction of an arm command 42.

Mass 22, or 26, is operable to move locking member 36 to a second position where it will be latched to prevent movement back to its initial position. The latching is accomplished by latch 44, which includes projecting arms 45 and 46 having respective arrowheads 47 and 48. When locking member 36 travels far enough it will be captured by the latch 44 in view of the arrowhead configuration 47/48, which latches with arrowhead 50 at the end of locking member 36.

Mass 22 and locking member 36 include a first projection arrangement where projection members of the mass 22 and locking member 36 engage one another to effect movement of the locking member 36 to its latched position in response to movement of mass 22 due to an acceleration. In particular, the movement of the mass 22 causes a substantially perpendicular movement of locking member 36, that is, the elongated moveable member 36, relative to the movement of the mass 22. The first projection arrangement includes a projection 60 connected to locking member 36 and a cam 61 at an end of the projection 60. Mass 22 includes a projection portion 62. The projection portion 62 includes a camming surface at its end. The camming surface is comprised of camming surfaces 63 and 64, which form a V-shaped depression. It is to be noted that the arrangement can be reversed with projection 62, which includes the cam 61, and projection 60, which includes the camming surfaces 63 and 64.

Mass 26 and locking member 36 include a second projection arrangement where projection members of mass 26 and locking member 36 engage one another to effect movement of the locking member 36 to its latched position in response to movement of mass 26 due to an acceleration. The second projection arrangement includes first and second projections 70 and 71 connected to locking member 36 and first and second projection portions 72 and 73 connected to mass 26. Projection portions 72 and 73 may be individual projections as illustrated, or they may form portions of a unitary piece 76, shown dotted, forming part of mass 26.

Projection portion 73 of mass 26 is positioned just above a beam 80 at a first end 81 thereof. The second end 82 of the beam 80 is positioned adjacent to projection 71 of the locking member 36. Beam 80 is operable to pivot about a fulcrum 84 so as to move either the first end 81 or the second end 82 in a direction, which will cause movement of the locking member 36 to its latched condition. In an exemplary embodiment, the fulcrum 84 is situated intermediate the first end 81 and the second end 82. Further, the fulcrum 84 is situated intermediate the beam 80 and the supports 30 so as to contact, simultaneously, the beam 80 and the supports 30.

In order to operate as a shock sensor, masses 22 and 26, as well as springs 32, locking member 36 and attached projections, projecting arms 45 and 46 and beam 80 must be free to move and therefore must be free of any underlying silicon dioxide insulating layer 14 (FIG. 1). One way to accomplish the removal of the underlying insulating layer is by applying an etchant such as hydrofluoric acid, which will dissolve the silicon dioxide.

The etchant will, in a relatively short period of time, dissolve the insulation beneath the springs 32, since they are of small width, thus freeing them for movement. In order to shorten the time for dissolving the silicon dioxide under the remaining moveable components, they are provided with a series of apertures 86 which extend from the top surface down to the insulating layer 14, thereby allowing the etchant direct access to the undersurface of these members. Although some of the etchant dissolves the insulation under the supports 30, and fulcrum 84, the process of freeing the remaining moveable components is completed before the supports and fulcrum are completely freed so that they remain immovable.

Figure 3A:
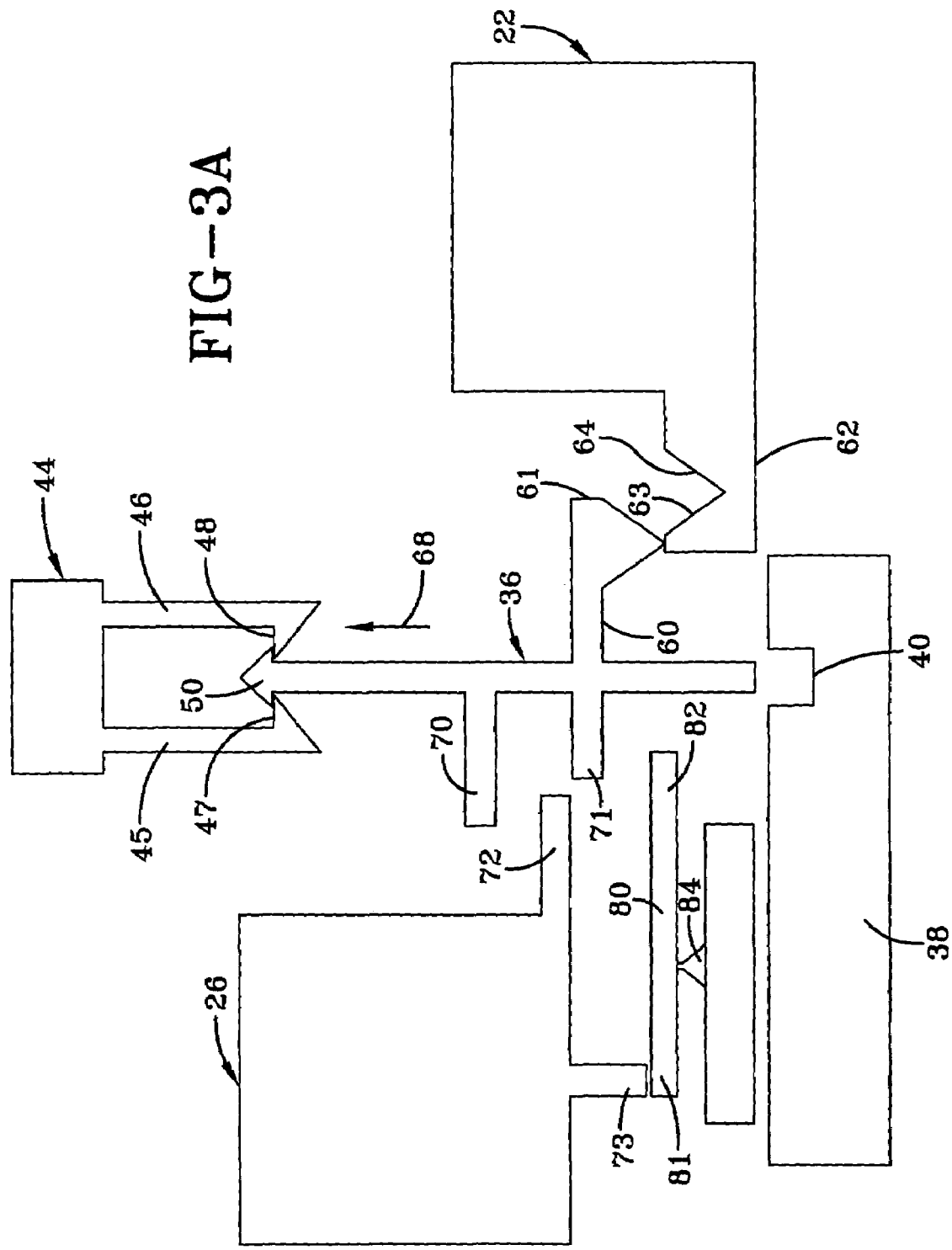

Operation of the sensor 20 will be described with reference to FIGS. 3A to 3D, where, for simplicity and clarity, the supports 30, springs 32 and apertures 86 have not been illustrated. Further, directional references such as right, left, up, down, vertical and horizontal, are given with respect to the sensor 20 as illustrated in the figures and not necessarily to movement in actual use. In FIG. 3A, in response to an initial shock or acceleration of sufficient magnitude to the left, mass 22 will move to the right causing cam 61 to ride along camming surface 63 resulting in an upward movement of locking member 36 in the direction of arrow 68, to its latched condition.

Similarly, acceleration of sufficient magnitude to the right will cause movement of mass 22 to the left, as illustrated in FIG. 3B, such that cam 61 will ride along camming surface 64 likewise resulting in an upward movement of locking member 36 to its latched condition.

Figure 3C:
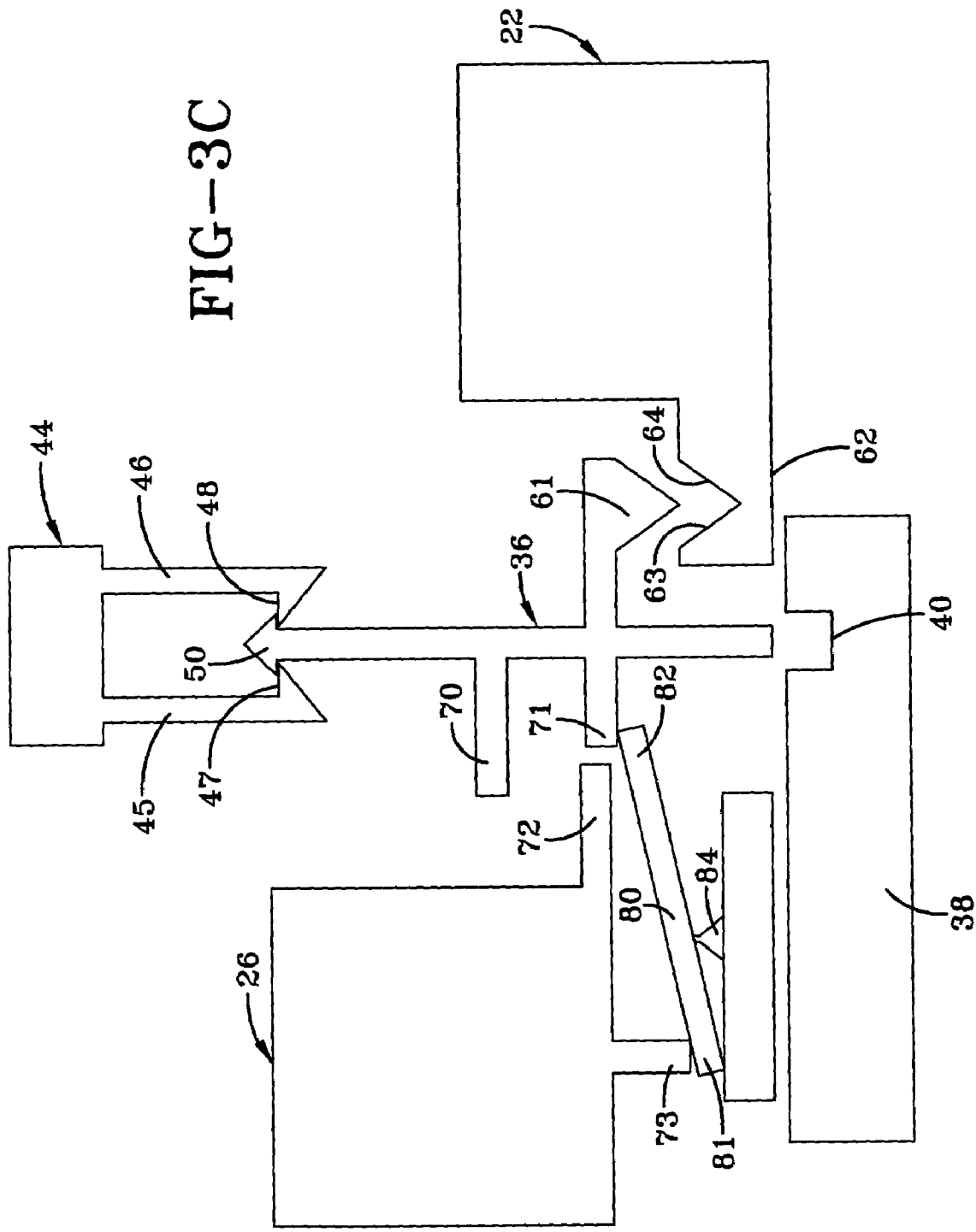

As illustrated in FIG. 3C, an upward acceleration of sufficient magnitude will cause mass 26 to move downward allowing projection portion 73 to engage first end 81 of beam 80. This action pivots beam 80 about fulcrum 84 whereby second end 82 of beam 80 engages and pushes on projection 71, connected to locking member 36, to move locking member 36 to its latched condition.

Figure 3D:
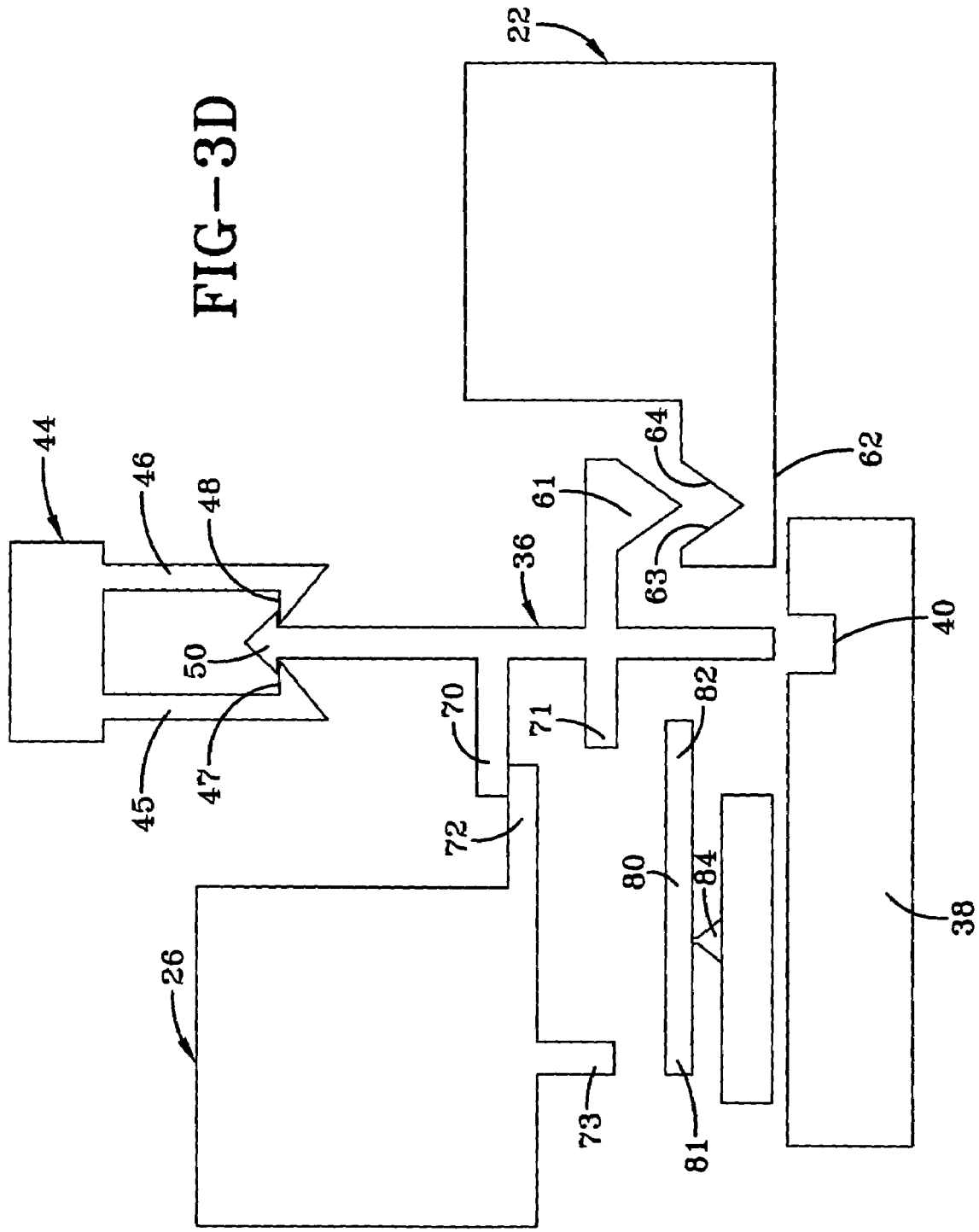

In FIG. 3D, a downward acceleration has caused mass 26 to move upward whereby projection portion 72 engages projection 70, resulting in an upward movement of locking member 36 to its latched condition. As indicated in FIGS. 3C and 3D, the movement of the mass 26 causes a substantially parallel movement of locking member 36, that is, the elongated moveable member 36, relative to the movement of the mass 26. In FIG. 3C, as compared to FIG. 3D, the substantially parallel movements of the mass 26 and locking member 36 are in opposite but substantially parallel directions.

If an acceleration is in a direction at an angle relatively near horizontal or vertical, the acceleration component may be enough to move a single mass to effect a full movement of locking member 36 to its latched position. At some intermediate angle however, the acceleration component may not be sufficiently large to enable a single mass to completely move the locking member 36. In such a situation, though, there would exist an acceleration component in both the horizontal as well as vertical directions such that both masses 22 and 26 would move and contribute to the moving of the locking member 36 to its latched position. In an exemplary embodiment, masses 22 and 26 concurrently move to contribute to the moving of the locking member 36.

Figure 4:
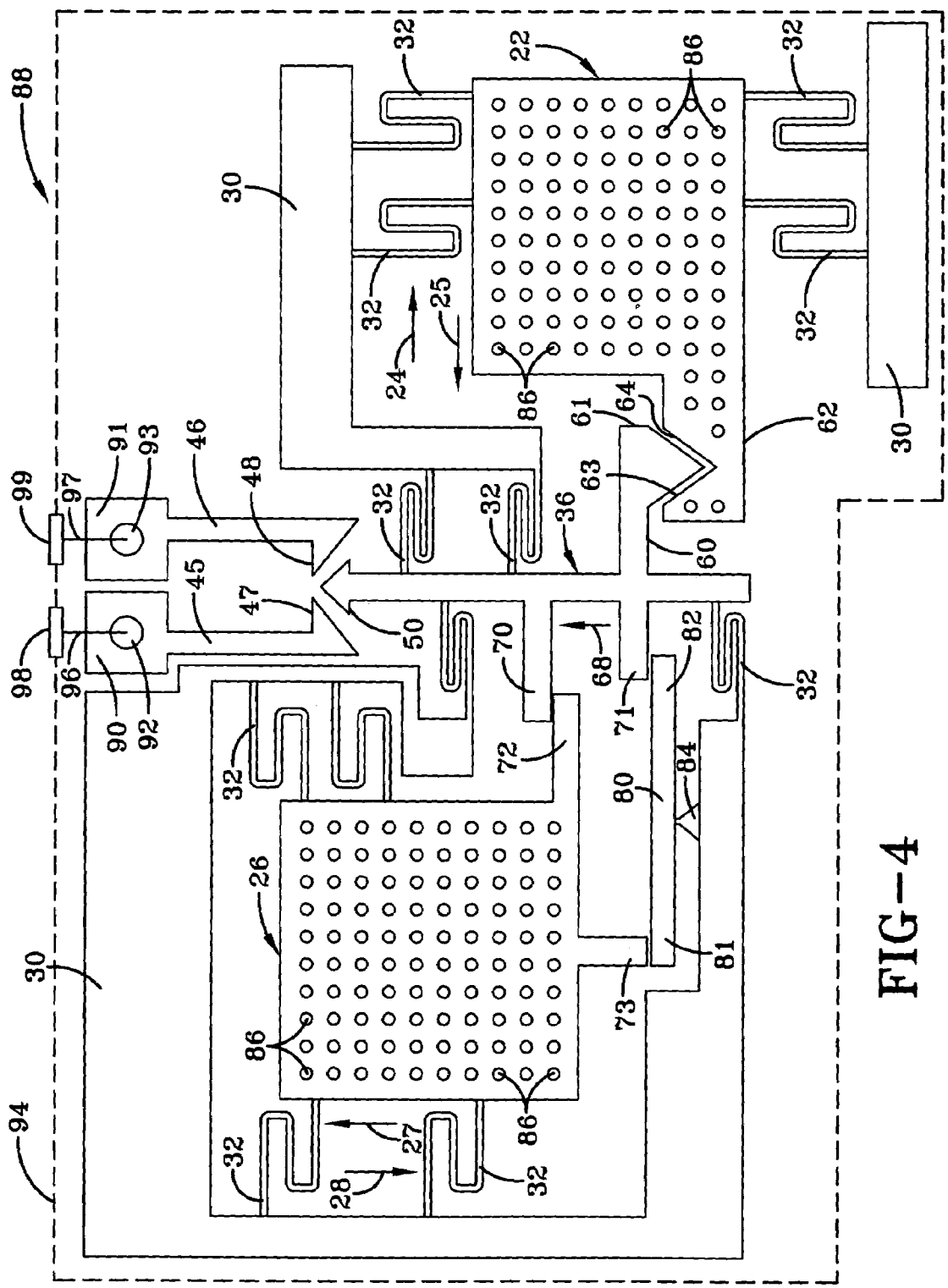
FIG. 4 illustrates another embodiment of the invention.

In FIG. 4, sensor 88 illustrates an embodiment of the invention, which may be used for other than in a submunition. Components previously described have been given the same reference numeral. Numeral 36, previously defining a locking member, in FIG. 4 now represents an elongated moveable member, without the locking function. Projecting arms 45 and 46 are each connected to a respective electrically conducting section 90 and 91, which are electrically isolated from one another.

When moveable member 36 is latched, by an action such as described in FIGS. 3A to 3D, an electric circuit is completed by the path including section 90, projecting arm 45, moveable member 36, projecting arm 46 and section 91. Contacts 92 and 93 on sections 90 and 91 may then be used to detect the completed circuit. By way of example, sensor 88 may be hermetically enclosed (as would be sensor 20) in a housing 94, shown dotted. Electrical leads 96 and 97 connect contacts 92 and 93 with external contacts 98 and 99 on the housing 94. The completed circuit may be detected at external contacts 98 and 99 and may be utilized to initiate an event or may be used simply to provide an indication that an acceleration of sufficient magnitude has taken place in the plane of the sensor 20.

Having thus shown and described what is at present considered to be the preferred embodiments of the present invention, it should be noted that the same has been made by way of illustration and not limitation. Accordingly, all modifications, alterations and changes coming within the spirit and scope of the present invention are herein meant to be included.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A multi-directional shock sensor, comprising:
   a moveable member normally situated at a first location;
   a first mass operable to move said moveable member out of said first location to a second location, in response to a first acceleration; and
   a second mass operable to move said moveable member out of said first location to said second location, in response to a second acceleration;
   a plurality of supports; and
   a plurality of springs connecting said first mass, said second mass and said moveable member to respective ones of said supports.

2. The sensor according to claim 1, wherein said first mass and said second mass are arranged to move in mutually perpendicular directions.

3. The sensor according to claim 1, wherein said moveable member completes an electrical circuit when in said second location.

4. The sensor according to claim 1, wherein said moveable member is an elongated moveable locking member.

5. The sensor according to claim 1, wherein said moveable member is configured intermediate said first mass and said second mass to respond to a shock in a plane of said moveable member.

6. The sensor according to claim 1, wherein said second mass is in contact with said moveable member.

7. The sensor according to claim 1, wherein said first mass is substantially adjacent said moveable member.

8. The sensor according to claim 1, wherein said first acceleration is substantially perpendicular to said second acceleration.

9. The sensor according to claim 1, wherein said first acceleration comprises a component in one of a first positive direction and a first negative direction in a plane of said moveable member, and
   wherein said second acceleration comprises a component in one of a second positive direction and a second negative direction in said plane.

10. The sensor according to claim 9, wherein said first positive direction and said first negative direction are substantially perpendicular to said second positive direction and said second negative direction.

11. The sensor according to claim 1, wherein said first mass and said moveable member comprise a first projection arrangement,
    wherein said second mass and said moveable member comprise a second projection arrangement, and
    wherein at least one of said first projection arrangement and said second projection arrangement is configured to move said moveable member in response to at least one of said first acceleration and said second acceleration.

12. A multi-directional shock sensor, comprising:
    a slider member;
    a moveable locking member positioned at a first location to prevent movement of said slider member;
    a first mass operable to move said moveable locking member out of said first location to a second, latched location, to allow movement of said slider member in response to an acceleration comprising a component in one of a first positive direction and a first negative direction;
    a second mass operable to move said locking member out of its first location to said second, latched location to allow movement of said slider member in response to an acceleration comprising a component in one of a second positive direction and a second negative direction;
    a plurality of supports; and
    a plurality of springs connecting said first mass, said second mass and said locking member to respective ones of said supports.

13. The sensor according to claim 12, wherein said slider member comprises a notch, and
    wherein said moveable locking member being is positioned within said notch when in said first location.

14. The sensor according to claim 12, wherein said first mass and said second mass are arranged to move in mutually perpendicular directions.

15. The sensor according to claim 12, wherein said first mass and said moveable locking member include a first projection arrangement,
    wherein said first projection arrangement includes a first projection connected to said moveable locking member and a second projection connected to said first mass, and
    wherein one of said first projection and said second projection comprises a cam at an end thereon and an other of said first projection and said second projection comprises a camming surface upon which said cam rides.

16. The sensor according to claim 15, wherein said camming surface is a substantially V-shaped camming surface.

17. The sensor according to claim 12, further comprising a fulcrum; and
    a beam comprising a first end and a second end, said beam substantially adjacent to said fulcrum so as to pivot about said fulcrum;
    wherein said second mass and said movable locking member include a second projection arrangement,
    wherein said second projection arrangement includes a first projection and a second projection connected to said moveable locking member,
    wherein said second mass including a third projection portion and a fourth projection portion, wherein said third projection portion is positioned substantially adjacent said first projection and operably engages said first projection to move said moveable locking member in response to movement of said second mass in said second negative direction, and wherein said fourth projection portion is positioned substantially adjacent said first end and operably engages said first end to pivot said beam about said fulcrum to allow said second end to engage said second projection to move said locking member in response to movement of said second mass in said second positive direction.

18. The sensor according to claim 12, wherein said slider member is part of an arming arrangement of a submunition.

19. A multi-directional shock sensor, comprising:
a slider member;
an elongated moveable locking member positioned at a first location to prevent movement of said slider member;
a first mass operable to move said elongated moveable locking member out of said first location to a second, latched location, to allow movement of said slider member in response to an acceleration comprising a component in one of a first positive direction and a first negative direction;
a second mass operable to move said elongated moveable locking member out of its first location to said second, latched location to allow movement of said slider member in response to an acceleration comprising a component in one of a second positive direction and a second negative direction;
a plurality of supports; and
a plurality of springs connecting said first mass, said second mass and said locking member to respective ones of said supports, wherein said first mass and said elongated moveable locking member include a first projection arrangement; said first projection arrangement including a first projection connected to said elongated moveable locking member and a second projection connected to said first mass, wherein one of said first projection and said second projection comprises a cam at an end thereon and an other of said first projection and said second projection comprises a camming surface upon which said cam rides, wherein said second mass and said elongated moveable locking member include a second projection arrangement, said second projection arrangement includes a first projection and a second projection connected to said elongated moveable locking member, a fulcrum, and a beam comprising a first end and a second end, which is operable to pivot about said fulcrum, wherein said second mass comprises a first projection portion and a second projection portion, wherein said first projection portion is positioned substantially adjacent said first projection of said second projection arrangement and operably engages said first projection to move said elongated moveable locking member in response to movement of said second mass in said second negative direction, and wherein said second projection portion is positioned substantially adjacent said first end of said beam and operably engages said first end to pivot said beam about said fulcrum to allow said second end to engage said second projection to move said locking member in response to movement of said second mass in said second positive direction.

* * * * *